United States Patent [19]

Nagumo

[11] 4,245,252
[45] Jan. 13, 1981

[54] TELEVISION CAMERA HAVING A CHARACTER DISPLAY

[75] Inventor: Fumio Nagumo, Yokohama, Japan

[73] Assignee: Sony Corporation, Tokyo, Japan

[21] Appl. No.: 821,820

[22] Filed: Aug. 4, 1977

[30] Foreign Application Priority Data

Aug. 19, 1976 [JP] Japan .................................. 51-99026
Aug. 20, 1976 [JP] Japan .................................. 51-99960

[51] Int. Cl.³ ........................ H04N 3/14; H04N 7/08; H04N 5/22; H04N 9/07
[52] U.S. Cl. ................................... 358/213; 358/142; 358/183; 358/44
[58] Field of Search ................. 358/22, 183, 213, 142, 358/146, 181, 41, 44, 212; 340/324 AD, 701, 703, 723, 745, 748, 750, 798, 799–801, 168 S; 307/221 D; 357/24

[56] References Cited

U.S. PATENT DOCUMENTS

| 3,580,993 | 5/1971 | Sandorf et al. | 358/183 |
| 3,758,712 | 9/1973 | Hudson | 358/183 |
| 3,891,792 | 6/1975 | Kimura | 358/142 |
| 3,898,644 | 8/1975 | Baxter | 340/800 |
| 3,900,887 | 8/1975 | Soga et al. | 358/142 X |
| 3,911,420 | 9/1975 | Lampson | 358/183 X |
| 4,011,401 | 3/1977 | Presti | 358/183 X |
| 4,013,832 | 3/1977 | Douglas | 358/723 X |
| 4,021,840 | 5/1977 | Weinger | 358/183 X |
| 4,052,719 | 9/1977 | Hutt et al. | 340/324 AD |

OTHER PUBLICATIONS

"Introduction to Solid-State Television Systems", Hansen, 1969, pp. 304–319 & 411.

Primary Examiner—Raymond F. Cardillo, Jr.
Assistant Examiner—Aristotelis M. Psitos
Attorney, Agent, or Firm—Hill, Van Santen, Steadman, Chiara & Simpson

[57] ABSTRACT

A solid state television camera with a pattern generator is disclosed for permitting a character display in a portion of a television picture. Both a solid state image sensor and a pattern generator are driven by the same synchronizing signal generator. A pattern signal generated by the character generator is superimposed upon or replaces a portion of the picked up image signal so that the pattern can be inserted into the picture.

3 Claims, 10 Drawing Figures

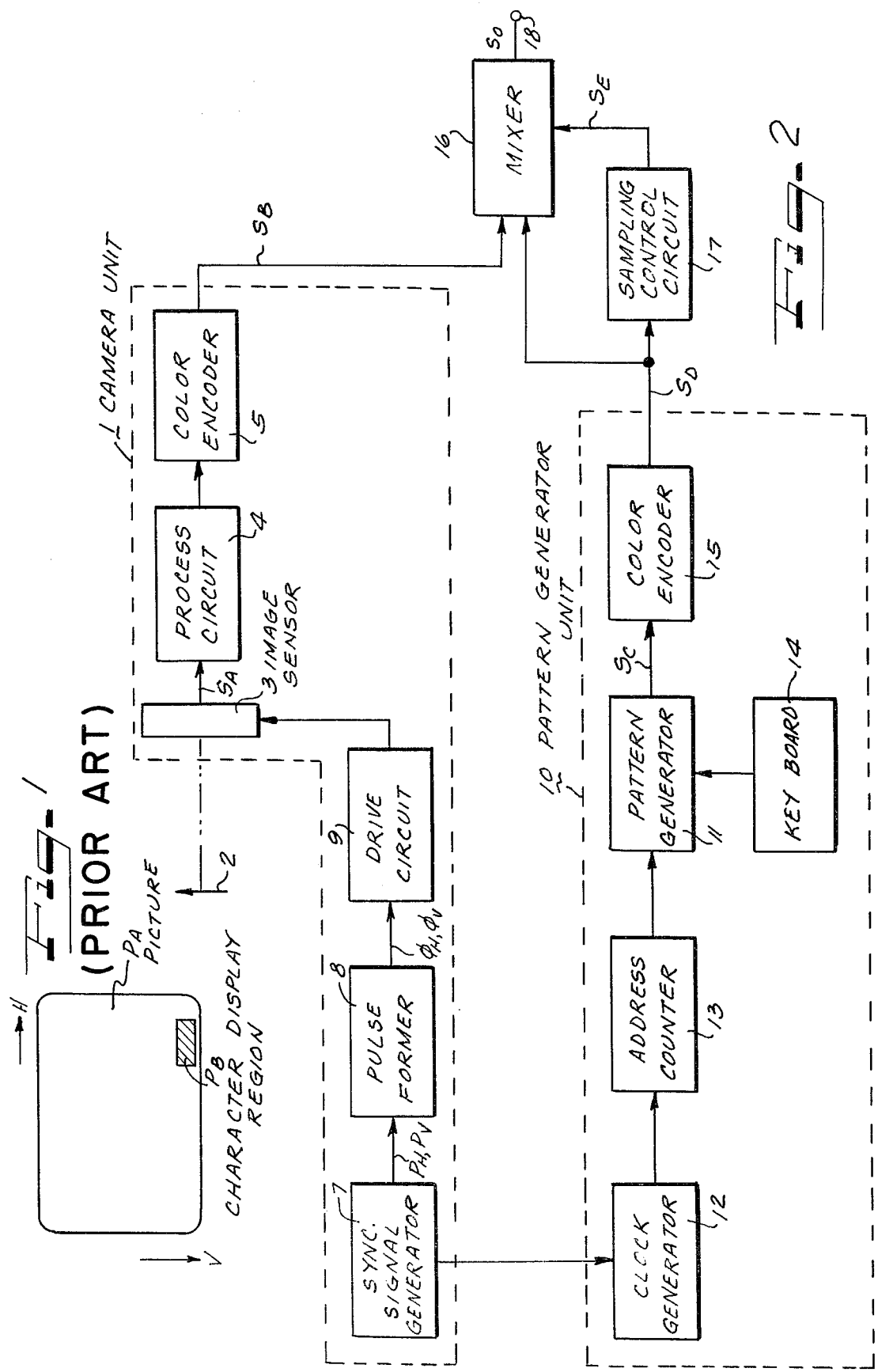

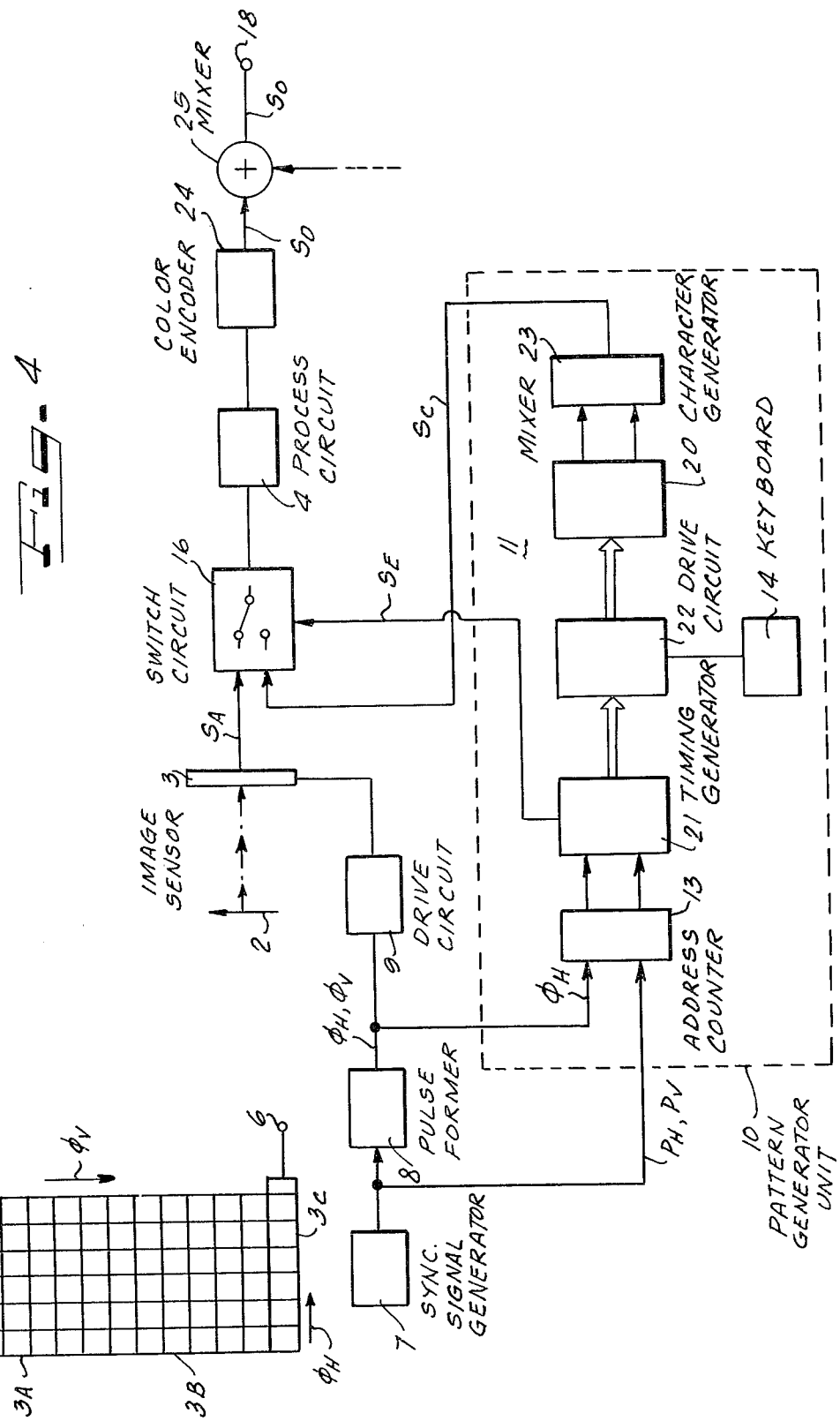

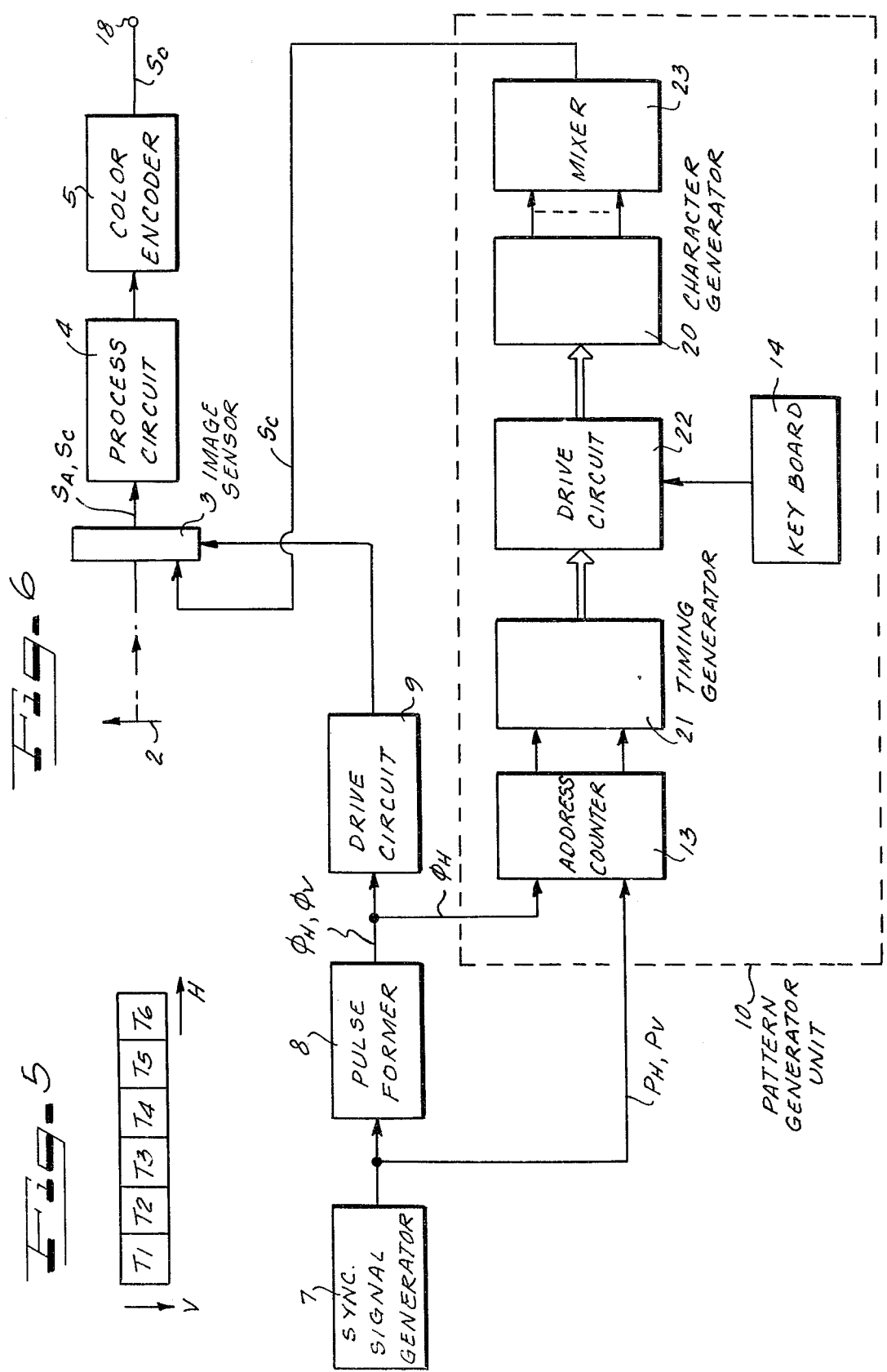

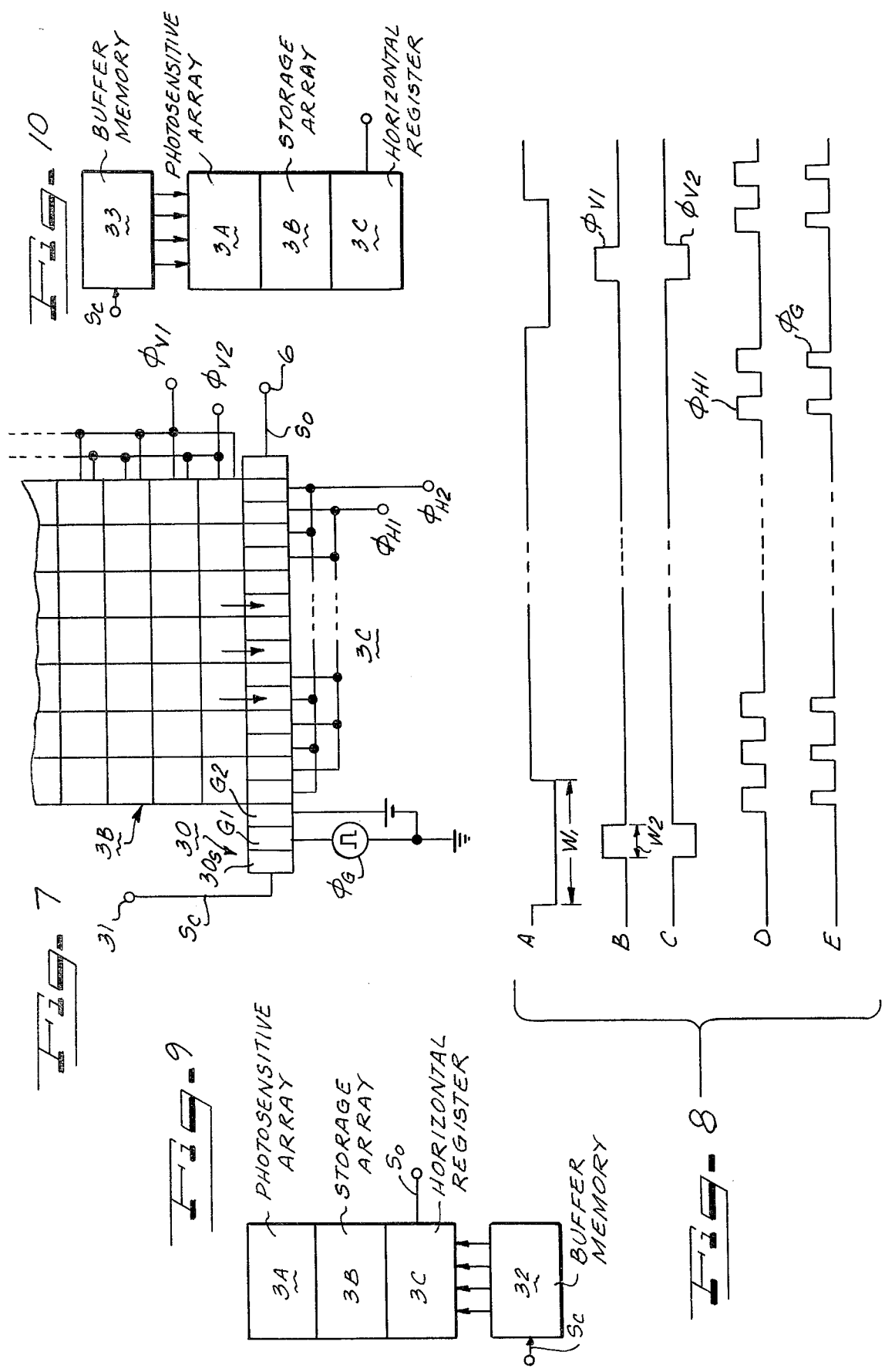

TELEVISION CAMERA HAVING A CHARACTER DISPLAY

BACKGROUND OF THE INVENTION

1. Field of the Invention

The present invention relates to a television camera with a pattern generator such that a desired pattern can be inserted into a picture.

2. Prior Art

It is known to insert a desired pattern, which is different from the image of an object, into a picture. For example, in the case of a television camera using a pick-up tube, it is known to provide a character generator unit which is independent of the camera. Usually the pattern signal converted into a video signal is mixed with the video signal derived from the camera. Consequently, the construction is very complicated.

SUMMARY OF THE INVENTION

It is an object of the invention to provide a television camera with a pattern generator.

It is another object of the invention to provide a television camera with a pattern generator in a system having simplified construction.

It is a further object of the present invention to provide a television camera with a pattern generator in which the image sensor and the pattern generator are synchronized.

According to the present invention, there is provided a solid state television camera which comprises a solid state image sensor, a pattern generator, and a mixing circuit to mix the picked-up signal and the pattern signal. The solid state image sensor and the pattern generator are driven by the same synchronizing signal generator. Then the mixed signals are converted into a desired video signal.

DESCRIPTION OF THE DRAWINGS

FIG. 1 illustrates a picture frame of a television to explain the present invention;

FIG. 2 illustrates a systematic diagram television camera with a character generator to explain the present invention;

FIG. 3 is a schematic diagram showing a charge transfer device used in the present invention as a solid state image sensor;

FIG. 4 is a schematic diagram showing an example of the television camera according to the present invention;

FIG. 5 illustrates character display regions $P_B$ which are inserted into a portion of a picture $P_A$;

FIG. 6 is a schematic diagram showing another embodiment of the television camera according to the present invention;

FIG. 7 illustrates a main portion of a charge transfer device which is employed in the present invention;

FIG. 8 is a wave form diagram to explain the operation of the television camera of the present invention; and FIGS. 9 and 10 illustrate alternative embodiments for mixing picked-up signals and pattern signals in the charge transfer device used in this invention.

DESCRIPTION OF THE PREFERRED EMBODIMENTS

Recently, solid state television cameras using a charge coupled device or a bucket brigate device have been developed. As shown in FIG. 1, to insert a predetermined pattern $P_B$, for example, characters including numerals into a picture derived from such image sensors, it is necessary to provide a pattern generator. The television camera with a pattern generator may be constructed as shown in FIG. 2.

In FIG. 2, block 1 shows a camera unit in which an object 2 is projected on an image sensor 3 to derive an output, i.e. a picked-up output signal $S_A$. The picked-up output signal $S_A$ is supplied to a color encoder 5 through a process circuit 4. In the color encoder 5 the picked-up output signal $S_A$ is converted into a desired color video signal $S_B$.

Usually the solid state image sensor of a charge coupled device is constructed as shown in FIG. 3.

FIG. 3 shows a charge coupled image sensor employing a so-called frame transfer system. The charge coupled image sensor is made of a photo sensitive array 3A which consists of a plurality of picture elements arranged on one surface of a semiconductor substrate in horizontal and vertical directions onto which an object is projected. The image sensor also has a temporary storage array 3B which is substantially the same as the photo sensitive array 3A and in which carriers corresponding to light information of the object are stored at positions which correspond to the picture elements of the photosensitive array. Finally, the image sensor has a horizontal read out shift register 3C. In FIG. 3, 6 designates an output terminal led out from the horizontal read out register 3C.

A drawing system for the solid state image sensor 3 is as follows. There is provided a synchronizing signal generator 7 to form pulses $P_H$, $P_V$, corresponding to horizontal and vertical scanning frequencies. These are supplied to a pulse former 8 to form a horizontal transfer pulse $\phi_H$ which is supplied to the read out horizontal register 3C to drive the same, and a vertical transfer pulse $\phi_V$ to transfer carriers in the vertical direction, as shown in FIG. 3. These pulses $\phi_H$ and and $\phi_V$ are supplied to the desired terminals of the charge transfer image sensor 3 through a drive circuit 9.

A pattern generator unit 10 comprises a pattern generator 11 and a clock generator 12 to drive the pattern generator 11.

An address counter 13 is driven by a signal which is synchronized with vertical and horizontal pulses generated by the clock generator 12 and the pattern generator 11 is driven by the output of the address counter 13. The address now being scanned on the image sensor is counted by the number of pulses derived from the clock generator 12. There is also provided a key board 14. For example, in order to display a date on a portion of the picture $P_A$, an output signal $S_C$ corresponding to the date established by the key board 14 is attained. The resulting output $S_C$ is supplied to a color encoder 15 in a fashion similar to the picked-up output signal $S_A$ to form a desired color video signal $S_D$. The color video signals $S_B$ and $S_D$ are supplied to a mixer 16. In this example, a portion of the picture $P_A$ is removed and the date $P_B$ is inserted at the place where the picture is removed. Accordingly, the mixer 16 is a switching circuit.

A sampling control circuit 17 which derives a control signal $S_E$ to control the clipping operation is driven by the color signal $S_D$. When the color signal $S_D$ arrives, the sampling control circuit 17 is turned on and only the color signal $S_D$ is derived from the mixer 16 to form a successive video signal $S_O$. In FIG. 2 terminal 18 designates an output terminal.

In the above explained television camera, the camera unit 1 and the pattern generator unit 10 must be operated synchronously. So the synchronizing generator 7 for the image sensor and the clock generator for the pattern generator must be synchronized or must be locked-in together. This is very troublesome. Also, the construction of the television camera shown in FIG. 2 is very complicated.

Now with reference to FIG. 4 a television camera of the present invention will be explained in detail. As shown in FIG. 4, there is provided a synchronizing signal generator 7 which is commonly used to drive a charge coupled image sensor and a pattern generator.

A horizontal pulse $P_H$ and a vertical pulse $P_V$ derived from the synchronizing signal generator 7 are supplied to a pulse former circuit 8 to form transfer pulses $\phi_H$, $\phi_V$ which drive the solid state image sensor 3. The pattern generator unit 10 is driven by the pulses $P_H$, $P_V$ derived from the synchronizing signal generator 7 and the pulse $\phi_H$ formed by the pulse former circuit 8. When the pattern which is displayed on the picture is a date, the pattern generator unit is designed to generate patterns of one of ten numerals from 0 to 9 for each character display region. Accordingly there is provided a character generator 20 which generates numeral patterns of 0 to 9.

What and when the character is generated by the character generator 20 is controlled by an output of a key board 14. A detailed explanation of the key board has not been presented here since such units may be easily constructed by one skilled in the art.

As explained previously, the horizontal and vertical pulses $P_H$, $P_V$ derived from the synchronizing signal generator 7 and the horizontal transfer pulse $\phi_H$ are supplied to an address counter 13, and addresses in the picture $P_A$ where the desired patterns $P_B$ should be displayed as shown in FIG. 1 are counted by these pulses $P_H$, $P_V$ and $\phi_H$. The pulse $\phi_H$ itself is a driving pulse for a charge coupled image sensor. Accordingly the number of counted pulses correspond to the address now being scanned.

The address where a desired pattern is represented by $\phi_H$ and $\phi_V$ and the address on the image sensor corresponds to the address of the beam scanning in the television picture.

As shown in FIG. 5, to display a date on the picture $P_A$, it is enough to consider six regions (addresses) T1 to T6, which represent year, month and day. To display predetermined figures on the addresses T1 to T6, first an output from the address counter 13 is supplied to a timing generator 21 to check the address now being scanned, and an output corresponding to the address T1 to T6 is derived from the timing generator 21. The above obtained output corresponding to addresses T1 to T6 are supplied to a drive circuit 22 for the character generator 20 with an output from the key board 14. The drive circuit 22 controls which numerals should be displayed and their location. The output corresponding to desired numerals selected from 0 to 9 derived from the character generator 20 is supplied to a switching circuit 16 through a mixer 23.

A sampling control signal $S_E$ is supplied to the switching circuit 16 to control the clipping of signal $S_A$ and insertion of signal $S_C$. In this example, the sampling control signal $S_E$ is a signal derived from the timing generator 21.

When a signal corresponding to the addresses from T1 to T6 is generated in timing generator 21, it signifies that the pattern $P_B$ should be displayed in a portion of the picture $P_A$. Accordingly the output of signals corresponding to the addresses T1 to T6 derived from the timing generator 21 can be the control signal $S_E$ which is substituted in the signal.

The switching circuit 16 is provided just after the solid state image sensor 3 where the picked-up output $S_A$ is not encoded. Accordingly, the output from the pattern generator unit 10 which is not encoded is supplied to the switching circuit 16. The output so obtained in the switching circuit 16 is supplied to a color encoder 24 through a process circuit 4 to be converted into a color video signal. This color video signal is supplied to a mixer 25 with a synchronizing signal and fed to output terminal 18.

As is apparent from the above example, by commonly utilizing a synchronizing signal generator, the camera unit 1 and the pattern generator unit 10 operate completely synchronously so that mis-synchronization of the camera and the pattern generator is completely removed. Furthermore, the construction of the camera is simplified. In the example of FIG. 4, the color encoder is also commonly used, so the construction is further simplified. As shown in FIG. 4, if a signal from the timing generator 21 controls the clipping operation of switching circuit 16, then it isn't necessary to provide a control circuit 17 as shown in FIG. 2. Of course it is possible to superimpose the pattern signal $S_C$ on the picked-up signal $S_A$ instead of employing a substitution.

Another embodiment of the present invention will be explained in detail with reference to FIGS. 6 to 8. In the following explanation, the parts corresponding to FIG. 4 are indicated by the same reference numbers and the explanation of the same parts as FIG. 4 is omitted.

In this embodiment, a character signal $S_C$ is generated in the same way as the embodiment of FIG. 4. The obtained pattern signal $S_C$ is supplied to the solid state image sensor 2 as a portion of the picture picked up by the sensor. FIG. 7 is an enlarged plan view of a part of the temporary storage portion 3B and the horizontal shift register 3C of the solid state image sensor which is driven by a two phase clock pulse to transfer signal charges. The transfer in the vertical direction is performed by the application of two sets of clock pulses $\phi_{V1}$, $\phi_{V2}$ which are different in phase by 180° from each other. Similarly, two sets of clock pulses $\phi_{H1}$, $\phi_{H2}$ are applied to the horizontal shift register which are different in phase by 180° from each other.

In this embodiment, the above mentioned pattern signal $S_C$ is supplied to the horizontal shift register 3C. There is provided a gate circuit 30 at one end of the horizontal shift register which is opposite the end where the output terminal is provided. As shown in FIG. 7, the gate circuit comprises a source region 30S and a first and a second gate region G1, G2. The second gate G2 has always applied thereto a predetermined voltage. Then the pattern signal $S_C$, which is supplied to the source region 30S through a terminal 31, is transferred successively in the horizontal shift register 3C by the application of a desired clock pulse $\phi_G$ to the first gate region G1. A more detailed explanation will be given with reference to FIG. 8.

All of the carriers stored in the last stage of the temporary storage array 3B, which corresponds to one horizontal scanning interval, are immediately transferred to the horizontal shift register 3C by the application of transfer clock voltage $\phi_{V1}$, $\phi_{V2}$ as shown in FIGS. 8B, 8C during a horizontal blanking interval $W_1$ in a period of $W_2$.

After being transferred into the horizontal shift register 3C, they are transferred to the right step-by-step by the application of horizontal transfer clock signals $\phi_{H1}$, $\phi_{H2}$ as shown in FIG. 8D. Similarly by the application of a clock pulse $\phi_G$ shown in FIG. 8E to the first gate G1 at a predetermined horizontal scanning period, the pattern signal $S_C$ which is supplied to the source region 30S is superimposed on the carrier derived from the image of the object and transferred. Accordingly, by picking up the image of the object when the pattern signal $S_C$ has been transferred to the horizontal shift register $S_C$ picked-up signal $S_O$, which has superimposed upon it the pattern signal $S_C$, is derived from the output terminal 6. Then, as shown in FIG. 6, the signal $S_O$ is supplied to the color encoder 5 through the process circuit 4, to obtain a desired video signal. By supplying the signal to a television receiver the picture is obtained in which desired numerals are displayed at the desired portion. As shown in the above example of the invention, the pattern signal generated by the pattern generator unit 10 is superimposed on the picked-up signal of the image of the object 2 projected on the image sensor 3. Accordingly, all the circuits after the output can be commonly used for the pattern signal and the picked-up signal.

There are other ways to superimpose the pattern signal into the picture signal. For example, as shown in FIG. 9 the desired pattern signal can be superimposed on the desired part of the picture signal by providing a buffer memory 32 having the same bit number as the horizontal read out shift register. The pattern signal is supplied to the buffer memory and temporarily stored there and immediately transferred to the horizontal shift register at a desired interval.

Furthermore, as shown in FIG. 10 the same object can be achieved by providing a buffer memory 33 at the photosensitive array corresponding to the first horizontal scanning line having a same bit number which is the same and a similar gate circuit. The pattern signal is supplied to the buffer memory through the gate circuit as in FIG. 6. Then carriers corresponding to the pattern signal are superimposed on the picture signal and transferred through the photosensitive array 3A and temporary storage region 3B.

The pattern inserted into a picture is not limited to the date. Time, sub-titles, or other symbols can be inserted into a picture.

It is obvious that the solid state image sensor is not limited to a frame transfer system C.C.D.

Furthermore, it is possible to insert a desired signal other than a pattern signal which is to be displayed in the picture sensed by the solid state image sensor. For example, an address signal, or a key word can be inserted in a vertical blanking interval.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A television camera comprising:
   a solid state image sensor means for generating a picked-up signal corresponding to an object in order to produce a picture of the object;
   a pattern generator means for generating a pattern signal to be inserted in the picked-up signal for the picture;
   a synchronizing signal generator means for creating horizontal and vertical driving pulses for said solid state image sensor means and said pattern generator means;
   said solid state image sensor means including means for mixing said pattern signal with the picked-up signal to create a mixed signal from the image sensor means;
   an encoder means for converting the mixed signal into a desired video signal;
   said image sensor means comprising a charge coupled device including a photo sensitive array and a horizontal read out shift register; and
   said pattern signal being supplied to said horizontal read out shift register.

2. A television camera comprising:
   a solid state image sensor means for generating a picked-up signal corresponding to an object in order to produce a picture of the object;
   a pattern generator means for generating a pattern signal to be inserted in the picked-up signal for the picture;
   a synchronizing signal generator means for creating horizontal and vertical driving pulses for said solid state image sensor means and said pattern generator means;
   said solid state image sensor means including means for mixing said pattern signal with the picked-up signal to create a mixed signal from the image sensor means;
   an encoder means for converting the mixed signal into a desired video signal;
   said image sensor means comprising a charge coupled device including a photo sensitive array and a horizontal read out shift register; and
   a buffer memory means for storing the pattern signal to be transferred to said horizontal shift register.

3. A television camera comprising:
   a solid state image sensor means for generating a picked-up signal corresponding to an object in order to produce a picture of the object;
   a pattern generator means for generating a pattern signal to be inserted in the picked-up signal for the picture;
   a synchronizing signal generator means for creating horizontal and vertical driving pulses for said solid state image sensor means and said pattern generator means;
   said solid state image sensor means including means for mixing said pattern signal with the picked-up signal to create a mixed signal from the image sensor means;
   an encoder means for converting the mixed signal into a desired video signal;
   said image sensor means comprising a charge coupled device including a photo sensitive array and a horizontal read out shift register; and
   a buffer memory means for storing the pattern signal to be transferred to said photosensitive array.

* * * * *